(12) United States Patent
Araki et al.

(10) Patent No.: US 6,521,734 B1
(45) Date of Patent: Feb. 18, 2003

(54) LOW-DENSITY POLYETHYLENE RESIN FOR LAMINATING, COMPOSITION THEREOF, LAMINATES PRODUCED THEREFROM AND PROCESS FOR PRODUCING THE SAME

(75) Inventors: Takumi Araki, Kawasaki (JP); Isao Hashimoto, Oita (JP); Toshio Taka, Kawasaki (JP)

(73) Assignee: Japan Polyolefins Co., Ltd., Tokyo (JP)

( * ) Notice: Subject to any disclaimer, the term of this patent is extended or adjusted under 35 U.S.C. 154(b) by 0 days.

(21) Appl. No.: 09/509,692

(22) PCT Filed: Sep. 29, 1998

(86) PCT No.: PCT/JP98/04347

§ 371 (c)(1),
(2), (4) Date: Mar. 30, 2000

(87) PCT Pub. No.: WO99/16796

PCT Pub. Date: Apr. 8, 1999

(30) Foreign Application Priority Data

Sep. 30, 1997 (JP) .............................................. 9-267463

(51) Int. Cl.$^7$ .............................................. C08F 110/02
(52) U.S. Cl. ................. 526/352.2; 526/227
(58) Field of Search ............... 526/227, 352.2

(56) References Cited

U.S. PATENT DOCUMENTS 5,306,791 A 4/1994 Muehlenbernd et al. ...... 526/86
5,539,075 A 7/1996 Gustafsson et al.

FOREIGN PATENT DOCUMENTS

| EP | 0 534 237 A1 | 3/1993 | ........... C08F/10/02 |
|---|---|---|---|
| EP | 0 656 393 A1 | 6/1995 | |
| JP | 57-157724 | 9/1982 | ........... B29D/9/00 |
| JP | 58-120654 | 7/1983 | ........... C08L/23/08 |
| JP | 58 157838 | 9/1983 | |
| JP | 358157838 A | * 9/1983 | |
| JP | 60-123544 | 7/1985 | ........... C08L/23/16 |
| JP | 04 306209 | 10/1992 | |
| JP | 5-138831 | 6/1993 | ........... B32B/27/12 |
| JP | 5-202131 | 8/1993 | ........... C08F/10/02 |
| JP | 7-26079 | 1/1995 | ........... C08L/23/08 |
| JP | 07 082429 A | 3/1995 | |

* cited by examiner

*Primary Examiner*—David W. Wu
*Assistant Examiner*—William Cheung
(74) *Attorney, Agent, or Firm*—Sughrue MIon, PLLC

(57) ABSTRACT

The invention relates to a low-density polyethylene resin for laminates, a composition thereof, and a laminate and production method therefor. The low-density polyethylene resin is one obtainable by a high pressure radical polymerization method and has a density of 0.910 to 0.935 g/cm$^3$, a melt flow rate of 0.1 to 300 g/10 min., and a terminal vinyl group number of 0.4 or more per 1,000 carbon atoms. According to the invention, a laminate having high interlayer adhesion strength can be obtained also by low-temperature, high-speed molding so that the occurrence of smoking and odor can be prevented. Also, the resin is excellent in productivity and economics. Further, the resin is excellent in productivity and economics because it can be readily made thinner. The laminate is suitable for application to, for example, food wrapping materials, containers, etc.

21 Claims, 1 Drawing Sheet

U.S. Patent

Feb. 18, 2003

US 6,521,734 B1

Figure 1:
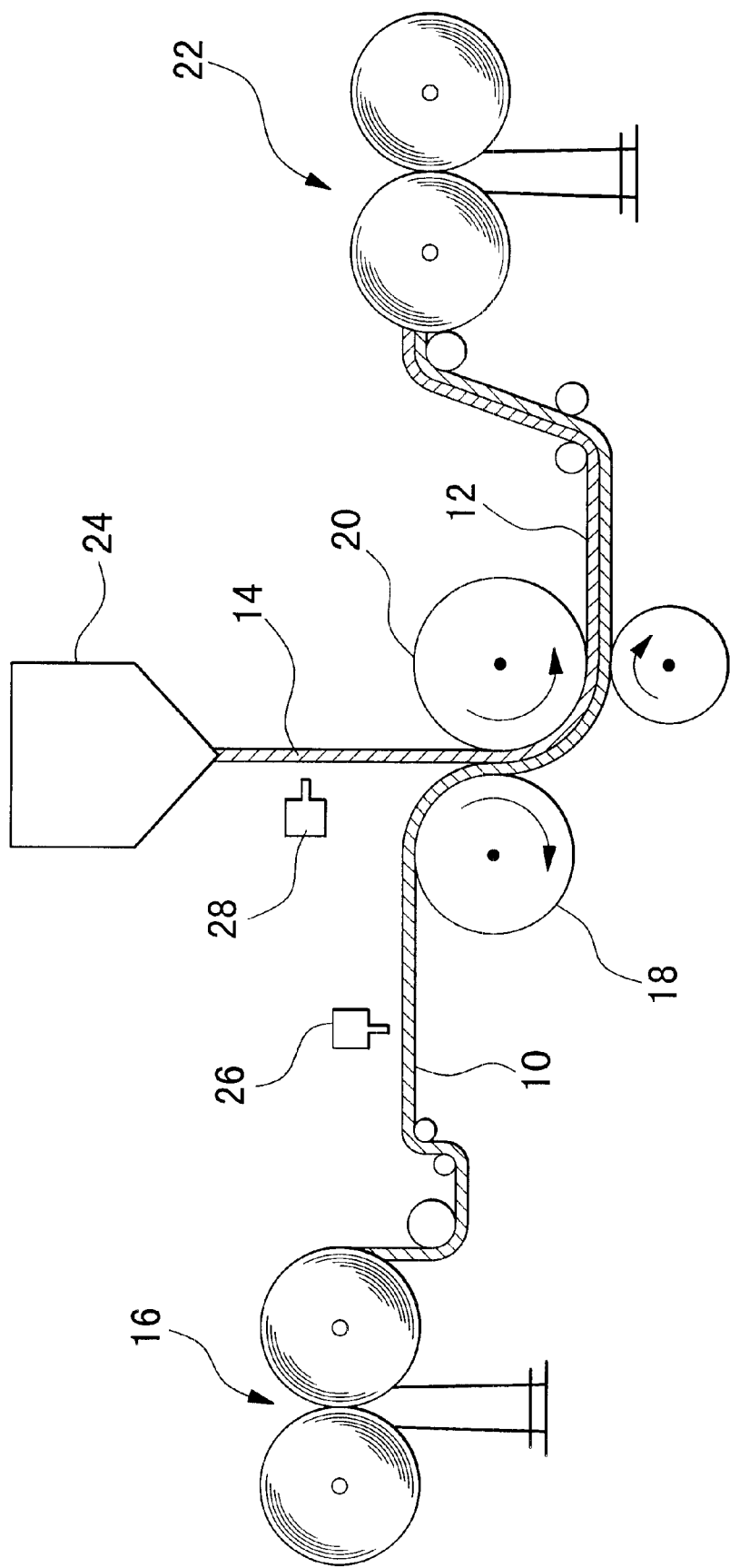

LOW-DENSITY POLYETHYLENE RESIN FOR LAMINATING, COMPOSITION THEREOF, LAMINATES PRODUCED THEREFROM AND PROCESS FOR PRODUCING THE SAME

TECHNICAL FIELD

The present invention relates to a low-density polyethylene resin for laminate, a composition thereof, a laminate using the same and a production method therefor. The laminate is useful for applications to, for example, food wrapping materials, containers, etc.

The present application is based on Japanese Patent Application No. Hei 9-267463, the contents of which are incorporated herein by reference.

BACKGROUND ART

As a wrapping material, in particular a food wrapping material, laminates have been used, including substrates made of polymers such as polypropylene, polyamide, polyester, saponification products of ethylene-vinyl acetate copolymer or the like, aluminum foil, cellophane, papers or the like and ethylene-based polymers such as polyethylene, ethylene-vinyl acetate copolymer, for imparting a heat sealing property or water vapor barrier property, the polymer being extrusion laminated on the substrate.

However, polyethylene is a non-polar resin and its adhesion to the substrate is essentially low.

Hence, to increase the adhesion to the substrate, generally, upon extrusion in extrusion laminate molding, the temperature of the resin is set to a high temperature of 310° C. or higher to oxidize the surface of the molten thin film extruded from an extruder.

However, when the temperature of resin is set to a high temperature of 310° C. or higher, thermal decomposition or oxidative deterioration occurs in polyethylene. As a result, sometimes, a large amount of smoke is produced so that the working environment is adversely affected, or the heat sealing performance of laminate is decreased an odor remains in the laminate, which decreases the product quality.

Further, recently, particularly for increasing productivity, it has been desired to perform molding at higher speed. However, increasing the molding speed further decreases the adhesion strength.

In the case of ethylene-vinyl acetate copolymer, if the extrusion molding temperature is set to 280° C. or higher, the ethylene-vinyl acetate copolymer in an extruder or die tends to decompose, thus making the acetic acid odor stronger, or forming bubbles, so that the temperature of resin upon extrusion laminate molding must be 260° C. or lower.

However, at such a low temperature, the adhesion strength to the substrate is too low to be practically acceptable.

Accordingly, the measure is taken that polyethylene is extrusion laminate molded on a substrate at a high temperature of 310° C. or higher in advance and an ethylene-vinyl acetate copolymer is extrusion laminate molded on the polyethylene surface at a temperature of 260° C. or lower. Therefore, the process is complicated and economically disadvantageous.

Japanese Patent Application, First Publication No. Sho 57-157724 discloses a method in which an ethylene-based resin is extruded at a low temperature of 150 to 290° C., treated with ozone, the treated surface thereof is contact laminated on an anchor-coat treated substrate.

This method alleviates the smoking or odor because of a low temperature molding. However, a decrease in the molding temperature results in a decrease in the bond strength. Therefore, to ensure a practically acceptable bond strength, the molding speed must be lowered so that there remain great problems in productivity and economics, for example, such that film thickness cannot be made thinner.

Japanese Patent Application, First Publication No. Hei 4-306209 discloses, as a material having an increased adhesion strength, an ethylene-propylene copolymer for extrusion laminates which has a methyl branch number of 3.5 or more per 1,000 carbon atoms in the polymer chain, a melt flow rate in the range of 1 to 20 g/10 min., and a long chain branching index in the range of 0.3 to 0.9. However, a further improvement in adhesion strength by low-temperature, high-speed molding has been desired.

As stated above, for laminates obtained by extrusion lamination molding polyethylene, elevation of the resin temperature in extrusion lamination molding causes the problems of the occurrence of smoking or odor and hence elevation of the temperature cannot be adopted and hence it is difficult to increase the adhesion strength. In particular, it is very difficult to increase the adhesion strength in high-speed molding.

DISCLOSURE OF THE INVENTION

Under the circumstances, an object of the present invention is to provide a low-density polyethylene resin which can be molded by high speed molding or low temperature molding, in particular laminate molded at low temperatures and high speed without the above-described accompanying drawbacks upon extrusion laminate molding, and which has sufficient adhesion to a substrate, a composition thereof, and a laminate and production method for the laminate.

The present inventors have carried out intensive research on the above problems and as a result they have found that by use of a specified low-density polyethylene resin obtained by a high-pressure radical polymerization method or composition thereof, the conventional problems upon extrusion laminate molding, i.e., achieving a high speed of molding, low temperature molding and low temperature high speed molding, elimination of odor, and improved heat seal strength and adhesion strength, etc. can be solved, thus completing the present invention.

That is, the low-density polyethylene resin of the present invention is characterized by being obtained by high pressure radical polymerization method and has a density of 0.910 to 0.935 g/cm$^3$, a melt flow rate of 0.1 to 300 g/10 min., and a terminal vinyl group number of 0.4 or more per 1,000 carbon atoms.

Also, the low-density polyethylene resin composition of the present invention comprises this low-density polyethylene resin to which less than 50 wt % of other polyethylene-based resins are blended.

The laminate of the present invention is characterized in that a layer of the low-density polyethylene resin or of the low-density polyethylene resin composition is provided on at least one surface of a substrate.

The method for producing a laminate according to the present invention is an extrusion laminate method which comprises a substrate supplying step for supplying a substrate, a resin surface treating step for practicing ozone treatment on a molten film consisting of a low-density polyethylene resin or low-density polyethylene resin composition of the present invention, a laminating step for pressing the ozone-treated surface of the molten film onto at least one surface of the substrate, and a winding step for winding the resultant laminate.

In the present invention, when low temperature molding where the resin temperature upon extrusion lamination is 200 to 310° C., high adhesion strength can be obtained and as a result, the occurrence of smoking and odor can be inhibited.

Further, when high speed molding where the molding speed upon extrusion lamination is 200 m/min. or higher is adopted, high adhesive strength can be obtained so that the method of the invention is excellent in productivity and economy. Since reducing the thickness of the laminate is easy, it is excellent in productivity and economy.

When an ordinary molding temperature is used, the molding speed can be double the conventional speed, so that the productivity can be increased markedly.

In addition, the low-density polyethylene resin or composition thereof of the present invention is inexpensive and the method for producing the laminate is simple and easy.

BRIEF DESCRIPTIONS OF THE DRAWINGS

FIG. 1 is a schematic diagram illustrating a lamination method by an extrusion lamination method.

BEST MODE FOR CARRYING OUT THE INVENTION

Hereinafter, the present invention will be explained in detail.

The low-density polyethylene resin of the present invention is obtained by a high-pressure radical polymerization method and has a density of 0.910 to 0.935 g/cm$^3$, preferably a density of 0.915 to 0.930 g/cm$^3$.

If the density is less than 0.910 g/cm$^3$ or exceeds 0.935 g/cm$^3$, it is difficult to produce it in a stable manner on an industrial scale by a high-pressure radical polymerization method.

The melt flow rate (MFR) is in the range of 0.1 to 300 g/10 min., preferably 0.5 to 100 g/10 min., more preferably, 1.0 to 100 g/10 min., even more preferably 10 to 80 g/10 min., still more preferably 25 to 60 g/10 min.

If the MFR is less than 0.1 g/10 min., the resin is poor in moldability while if the MFR exceeds 300 g/10 min., the adhesion strength, such as the heat sealing property of the product, is poor.

It is important that a terminal vinyl group is present in the low-density polyethylene resin in a number of 0.4 or more per 1,000 carbon atoms in the polymer chain and a range of 0.45 to 0.8 is more preferred.

If the terminal vinyl group is present in a number of less than 0.4, no increase in adhesion strength at the time of high-speed molding or low-temperature, high-speed molding can be expected.

The number of terminal vinyl groups can be readily measured by infrared analysis (IR).

Here, the above high-pressure radical polymerization method is a method for performing polymerization at a pressure in the range of 500 to 3,500 Kg/cm$^2$G, at a polymerization temperature in the range of 100 to 400° C., using a tubular reactor or an autoclave reactor in the presence of an organic or inorganic radical polymerization initiator, such as peroxide, etc. In that case, it is desirable to perform polymerization with continuous feeding of ethylene and propylene.

The low-density polyethylene resin composition of the present invention is a mixture of the above low-density polyethylene as a major component, to which another polyethylene-based resin is blended. The blending ratio is preferably 50 wt % or more and 99 wt % or less of the above low-density polyethylene resin and 1 wt % or more and less than 50 wt % of the other polyethylene-based resin. More preferably, the proportion of the above low-density polyethylene is 97 to 60 wt % and the other polyethylene-based resin is 3 to 40 wt %, and still more preferably, the above low-density polyethylene is 95 to 70 wt % and the other polyethylene-based resin is 5 to 30 wt %.

The above other polyethylene-based resin includes super low-density polyethylenes having a density of 0.86 to less than 0.91 g/cm$^3$, linear low-density polyethylenes having a density of 0.91 to 0.94 g/cm$^3$, medium-/high-density polyethylenes having a density of 0.94 to 0.97 g/cm$^3$, polymerized at low, medium or high pressure in the presence of a ion-type catalyst such as Ziegler-type catalyst, Phillips-type catalyst, metallocene-type catalyst and so on, and in addition low-density polyethylene by the high-pressure radical polymerization method, ethylene/vinyl ester copolymer, ethylene/α,β-unsaturated carboxylic acid (or derivatives thereof) copolymer, ionomer resins, etc.

Here, the low-density polyethylene (LDPE) by the high-pressure radical polymerization method as the other polyethylene-based polymer has a density of 0.91 to 0.935 g/cm$^3$, more preferably 0.912 to 0.930 g/cm$^3$. Its melt flow rate is 0.001 to 1,000 g/10 min., preferably 0.1 to 100 g/10 min., and more preferably 1.0 to 80 g/10 min.

Its melt tension is preferably 1.5 to 25 g, more preferably 3 to 20 g.

It is desirable that the molecular weight distribution (Mw/Mn) is selected within the range of 3.0 to 10, preferably 4.0 to 8.0.

The ethylene/vinyl ester copolymer means a copolymer comprising ethylene as a major component and a vinyl ester monomer such as vinyl propionate, vinyl acetate, vinyl caproate, vinyl caprylate, vinyl laurylate, vinyl stearate, or vinyl trifluoroacetate. Particularly preferred among these ethylene/vinyl acetate (EVA) can be cited. For example, copolymers which are comprised by 50 to 99.5 wt % of ethylene, 0.5 to 50 wt % of vinyl ester, and 0 to 49.5 wt % of other copolymerizable unsaturated monomers. Of these, it is preferred that the vinyl ester content is 3 to 20 wt % and 5 to 15 w % is more preferred.

As typical copolymers of the ethylene/α,β-unsaturated carboxylic acid (or derivatives thereof) copolymer, copolymers of ethylene and (meth)acrylic acid or its alkyl ester copolymer, or metal salts thereof, etc. can be cited. The comonomers include acrylic acid, methacrylic acid, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, lauryl methacrylate, stearyl acrylate, stearyl methacrylate, glycidyl acrylate, glycidyl methacrylate, etc. Of these, alkyl esters such as methyl (meth)acrylate, ethyl (EEA), etc., are particularly preferred. The (meth)acrylic acid ester content is preferably 3 to 20 wt % and 5 to 15 wt % is more preferred.

Further, within the range where the gist of the present invention is not departed, ordinary additives such as other resin, rubber, etc., pigments, dyestuffs, antioxidants, ultraviolet absorbents, antistatic agents, lubricants, fatty acid metal salts, acid absorbers, crosslinking agents, and foaming agents may be blended.

In the present invention, inorganic filler and/or organic filler may be blended in 100 parts by weight, preferably 5 to 50 parts by weight, per 100 parts by weight of the low-density polyethylene resin or the low-density polyethylene resin composition.

As such a filler, mention may be made of, for example, metal carbonate salts such as calcium carbonate and magnesium carbonate, hydroxides, metal oxides such as titanium oxide and zinc oxide, inorganic fillers such as silica and talc, and organic fillers such as biodegradable substances and natural or synthetic fibers, etc.

As a blending method for obtaining the above low-density polyethylene resin composition, the blending can be carried out by ordinary mixing operations, for example, a tumbler mixer method, a Henschel mixer method, a Banbury mixer method, or an extrusion granulation method.

The laminate of the present invention comprises a layer composed of the above low-density polyethylene resin or compositions thereof provided on one or both surfaces of a substrate.

As the substrate used in the present invention, a sheet-like or film-like one (unless otherwise indicated, references to "sheet-like" include "film-like") is exemplified as a typical one.

In the present invention, the substrate refers to a layer on which a layer composed of the above-mentioned low-density polyethylene resin or compositions thereof of the present invention is provided and is not particularlized by the arrangement in the laminate, function, and utility. The substrate includes not only a single layer but also one that is constituted by a plurality of layers.

As a material suitable as a substrate, mention may be made of a synthetic resin, a metal foil, a metal plate, cellophane, paper, woven fabric, and non-woven fabric.

As substrates composed of synthetic resins, mention may be made of polyethylene, polypropylene, polyamide, polyester, saponification products of ethylene-vinyl acetate copolymers, polyvinylidene chloride, polycarbonate, etc. Further, secondary processed materials such as stretched articles obtained by subjecting the film or sheet to stretching treatment, printed articles obtained by subjecting the film or sheet to printing, deposited articles obtained by depositing metal or oxides thereof such as silicon or oxides of silicon on the film or sheet are cited as preferred ones.

As the metal foil or metal plate, mention may be made of aluminum, iron, copper, nickel, zinc or alloys containing these as major components.

As for paper, mention may be made of paperboard, high-quality paper, craft paper, glassine paper, inorganic fiber-mixed paper, synthetic resin-mixed paper, etc.

As the layer constitution of laminate, for example, the following combinations are cited. LDPE/paper, LDPE/paper/LDPE, LDPE/OPP, LDPE/OPP/LDPE, LDPE/PA, LDPE/PA/LDPE, LDPE/PEs, LDPE/PEs/LDPE, LDPE/EVOH, LDPE/EVOH/LDPE, LDPE/non-woven fabric, LDPE/Al foil, LDPE+HDPE/paper/LDPE, LDPE+EVA/paper, LDPE/paper/printed PET/LDPE (here, LDPE: the above low-density polyethylene resin or compositions thereof, OPP: biaxially stretched polypropylene, PA: polyamide, EVOH: saponified product of ethylene-vinyl acetate copolymer, PEs: polyester, Al foil: aluminum foil, HDPE: high-density polyethylene, and EVA: ethylene vinyl acetate copolymer).

The laminate of the present invention is produced preferably by lamination by an extrusion laminate method. That is, the laminate of the present invention can be produced by laminating and bonding the above-described low-density polyethylene resin or low-density polyethylene resin composition of the invention on at least one surface of a substrate by the extrusion lamination method, or upon laminating and bonding, surface treating the substrate and/or a film composed of the low-density polyethylene resin or low-density polyethylene resin composition, and then bonding them to each other through the treated surface. A desirable production method is an extrusion laminate method which comprises a substrate supplying step for supplying a substrate, a resin surface treating step for practicing ozone treatment on a molten film consisting of a low-density polyethylene resin or low-density polyethylene resin composition of the present invention, a laminating step for pressing the ozone-treated surface of the molten film onto at least one surface of the substrate, and a winding step for winding the resultant laminate.

A specific example of the extrusion laminate method will be explained referring to FIG. 1. As a substrate supplying step, a predetermined substrate 10 is delivered from a delivery machine 16 at a predetermined speed and is fed to between a nip roll 18 and a cooling roll 20. At this time, the substrate 10 is desirably subjected to corona treatment. At the same time, as a resin surface treatment step, the above-mentioned low-density polyethylene resin or low-density polyethylene resin composition is extruded from a T-die of an extruder 24 as a molten film 14, which is a molten resin in the form of a film, and ozone treatment is carried out on the molten film 14. As an apparatus used for extrusion laminate molding, usually a T-die type apparatus may be used.

Then, as a laminating step, the substrate 10 and the molten film 14 are pressed and laminated between the nip roll 18 and the cooling roll 20. At this time, the surface of the molten film 14 on which ozone treatment has been carried out is made to contact the substrate 10. Thereafter, the resultant laminate composed of the substrate 10 and the resin layer 12 is as a winding step wound by a winding machine 22.

The ozone treatment may be carried out by blowing ozone from an ozone supplier 28 onto the molten film discharged from the extruder. As the conditions of ozone treatment, the concentration of ozone to be blown is preferably 1 to 300 g/m$^3$, more preferably 5 to 100 g/m$^3$. The blowing amount is preferably 0.1 to 30 m$^3$/hr, more preferably 1 to 8 m$^3$/hr.

As a means for increasing the adhesion strength, ozone treatment has been heretofore utilized. However, in the present invention, the modifying effect by ozone treatment by reaction of terminal vinyl group in the resin and ozone is great and as a result of the synergism between the adhesion strength improving effect due to the resin component and the ozone treatment, the adhesion strength of the resin layer with other layers such as the substrate increases significantly compared to the conventional technology.

In a general extrusion laminate method, the resin temperature at the time of extrusion molding is 280 to 350° C. In contrast, in the method that uses the low-density polyethylene resin or low-density polyethylene resin composition of the present invention and also uses ozone treatment in combination, even when the molding temperature is lowered 200 to 310° C., a high adhesion strength can be obtained. By setting the molding temperature to 300° C. or lower, odor or environmental pollution that may occur upon laminating at 310° C. or higher as has been conventionally done can be reduced without losing adhesion strength.

As the surface treatment onto the substrate, surface treatment such as preheating treatment, corona treatment, flame treatment, or ultraviolet ray treatment can be used. However, corona treatment is preferable. The interlayer adhesion strength between a substrate that has been subjected to corona treatment and a resin layer that has been subjected to ozone treatment to increase the degree of oxidation is very high so that faster high speed molding is possible. Also, even at low temperature molding at 200 to 300° C., high speed molding of 200 to 400 m/min. is possible.

It is desirable that the corona treatment be carried out using a corona discharger at 1 to 300 W·min./m$^2$, preferably 10 to 100 W·min./m$^2$.

By controlling the temperature of the resin at the time of extrusion laminating, the wettability of the surface of the resin layer can be controlled and the adhesion of the surface of the resin layer can also be controlled.

The method for producing a laminate according to the present invention is effective not only in the case where one layer of the low-density polyethylene or its composition is extrusion laminated onto at least one surface of the substrate, but also in the case that, for example, two or more layers are extrusion laminated on one surface of the substrate such that using two or more types of polyethylene resins, one polyethylene resin is on the substrate side and another on the outside thereof, and in the case where low-density polyethylene resin is extrusion laminated on both surfaces of the substrate.

Further, in the above-described extrusion laminate molding methods, an adhesive, an anchor coat, etc. may be present intervening between the substrate and the low-density polyethylene resin. However, according to the present invention, because of the high adhesion strength, adhesives such as the anchor coat, etc. may be rendered unnecessary. As a result, complicated coating steps, preparation steps for an anchor coat agent, wiping steps for wiping the anchor coat agent attached to rolls, etc., become unnecessary so that the workability is improved and cost cutting may be attempted. Further, the resultant molded article is preferable particularly as a food wrapping material or as a container.

Although the thickness of laminate layer is not particularly limited and may be selected as desired, the present invention is advantageous in that the thickness of laminate layer can be made thinner.

High-speed molding means a molding speed of 200 m/min. or more. Low temperature molding means that the molding temperature (the resin temperature at the time of molding) is 310° C. or lower. Low-temperature, high-speed molding means molding conditions such that the molding temperature is 310° C. or lower and the molding speed is 200 m/min. or higher. According to the present invention, even when more severe low-temperature, high-speed molding is conducted, in which the molding temperature is 310° C. and the molding speed is 200 m/min., particularly when the molding temperature is 200 to 310° C., preferably 240 to 280° C., more preferably 250 to 280° C., and the molding speed is 200 to 400 m/min, a laminate can be obtained without a decrease in adhesion strength.

Further, for molding under ordinary temperature conditions, the molding speed can be increased Hereinafter, the present invention will be explained more concretely by examples. The present invention is not limited thereby.

EXAMPLES 1 to 3, 6 AND 8

Using a 2-L autoclave with a stirrer, low-density polyethylene resin (I) was produced at 1550 atm, and an average polymerization temperature of 200° C. by continuously feeding a radical polymerization initiator, ethylene monomer and propylene.

The resultant low-density polyethylene resin (I) had a MFR of 8.5 g/10 min., a density of 0.924 g/cm$^3$ (measured according to Japanese Industrial Standard K6760), and a terminal vinyl group number measured by IR of 0.5 per 1,000 carbon atoms in the polymer chain.

This low-density polyethylene resin (I) was laminated on paper (Examples 1 to 3) or aluminum foil (Examples 6 and 8) using a laminate molding machine 90 mm wide under the conditions shown in the Tables to produce each laminate.

Further, in Examples 3 and 8, ozone treatment (conditions: 40 g/m$^3$, 4 m$^3$/hr) was carried out on the molten film of polyethylene.

The resultant laminates were evaluated for interlayer adhesion strength and odor.

EXAMPLE 4

A polyethylene resin composition was prepared such that the low-density polyethylene resin (I) of Example 1 above was 80 wt % and high-density polyethylene was 20 wt %, and laminated on paper using a laminate molding machine 90 mm wide under the conditions shown in Table 4 to produce a laminate.

Further, ozone treatment (conditions: 40 g/m$^3$, 4 m$^3$/hr) was carried out on the molten film of polyethylene.

The resultant laminates were evaluated for interlayer adhesion strength and odor. The results of evaluation are shown in Table 4.

EXAMPLE 5

A laminate was produced by laminating a resin composition in which 10 parts by weight of titanium oxide was blended with 90 parts by weight of the low-density polyethylene resin (I) of Example 1 above on paper under the conditions shown in Table 4.

Further, ozone treatment (conditions: 40 g/m$^3$, 4 m$^3$/hr) was carried out on the molten film of polyethylene.

The resultant laminates were evaluated for interlayer adhesion strength and odor.

EXAMPLE 7

Using a 2-L autoclave with a stirrer, low-density polyethylene resin (II) was produced at 1550 atm, and an average polymerization temperature of 200° C. by continuously feeding a radical polymerization initiator, ethylene monomer and propylene.

The resultant low-density polyethylene resin (II) had a MFR of 8.4 g/10 min., a density of 0.924 g/cm$^3$ (measured according to Japanese Industrial Standard K6760), and a terminal vinyl group number measured by IR of 0.43 per 1,000 carbon atoms in the polymer chain.

Using this low-density polyethylene resin (II), a laminate was produced in the same manner as in Example 6 and its adhesion strength and odor were evaluated. The results of evaluation are shown in Table 5.

Comparative Example 1 to 6

In the same manner as in Example 1 above, low-density polyethylene resin(III) having aMFR of8.2 g/10 min., a density of 0.924 g/cm$^3$ (measured according to Japanese Industrial Standard K6760), and a terminal vinyl group number measured by IR of 0.05 per 1,000 carbon atoms in the polymer chain was prepared and molded under the conditions shown in the Tables.

Further, in Comparative Examples 3 and 6, ozone treatment (conditions: 40 g/m$^3$, 4 m$^3$/hr) was carried out on the molten film of polyethylene.

EXAMPLES 9 AND 11

Using a 2-L autoclave with a stirrer, low-density polyethylene resin (IV) was produced at 1550 atm, and an average polymerization temperature of 200° C. by continuously feeding a radical polymerization initiator, ethylene monomer and propylene.

The resultant low-density polyethylene resin (IV) had a MFR of 30 g/10 min., a density of 0.924 g/cm$^3$ (measured according to Japanese Industrial Standard K6760), and a terminal vinyl group number measured by IR of 0.57 per 1,000 carbon atoms in the polymer chain.

This low-density polyethylene resin (IV) was laminated on paper (Example 9) or aluminum foil (Example 11) using a laminate molding machine 90 mm wide under the conditions shown in the Tables to produce each laminate.

Further, ozone treatment (conditions: 40 g/m$^3$, 4 m$^3$/hr) was carried out on the molten film of polyethylene.

The resultant laminates were evaluated for interlayer adhesion strength and odor.

Comparative Examples 7 and 9

In the same manner as in Examples 9 and 11 above, low-density polyethylene resin (V) having a MFR of 30 g/10 min., a density of 0.924 g/cm$^3$ (measured according to Japanese Industrial Standard K6760), and a terminal vinyl group number of 0.05 per 1,000 carbon atoms in the polymer chain was prepared and molded under the conditions shown in each Table.

EXAMPLES 10 AND 12

Using a 2-L autoclave with a stirrer, low-density polyethylene resin (VI) was produced at 1550 atm, and an average polymerization temperature of 200° C. by continuously feeding a radical polymerization initiator, ethylene monomer and propylene.

The resultant low-density polyethylene resin (VI) had a MFR of 50 g/10 min., a density of 0.924 g/cm$^3$ (measured according to Japanese Industrial Standard K6760), and a terminal vinyl group number measured IR of 0.6 per 1,000 carbon atoms in the polymer chain.

This low-density polyethylene resin (VI) was laminated on paper (Example 10) or aluminum foil (Example 12) using a laminate molding machine 90 mm wide under the conditions shown in the Tables to produce each laminate.

Further, ozone treatment (conditions: 40 g/m$^3$, 4 m$^3$/hr) was carried out on the molten film of polyethylene.

The resultant laminates were evaluated for interlayer adhesion strength and odor.

Comparative Example 8

In the same manner as in Example 10 above, low-density polyethylene resin (VII) having a MFR of 50 g/10 min., a density of 0.924 g/cm$^3$ (measured according to Japanese Industrial Standard K6760), and a terminal vinyl group number of 0.05 per 1,000 carbon atoms in the polymer chain was prepared and molded under the conditions shown in Table 9.

The results of evaluation of each example and comparative example are shown in the Tables.

[(A) Adhesion Strength (Bonding to Paper)]

Adhesion strength to a paper substrate was evaluated for the situation in which an interlayer peeling operation was conducted based on following three-stage evaluation standards.

A: Paper and polyethylene film firmly integrated without stringing or peeling off of polyethylene.

B: Peeling was possible though not so carefully treated.

C: Readily peeled off.

[(B) Adhesion Strength (Bonding to Aluminum Foil)]

The adhesion strength with an aluminum foil substrate was measured by cutting an extrusion laminate molded article to a width of 15 mm, conducting peeling at a rate of pulling of 300 mm/min. by a 180° peeling test using a universal tensile machine (Orientech Co., Ltd.) and the strength required for peeling the polyethylene film from the substrate was measured.

[Odor]

A three stage evaluation was carried out by organoleptic tests by panelists.

A: Almost no odor was noted.

B: Slight odor was noted.

C: Strong odor was noted.

TABLE 1

|  | Example 1 | Comparative Example 1 |
|---|---|---|
| LPDE TYPE | I | III |
| Amount (wt %) | 100 | 100 |
| MFR (g/10 min.) | 8.5 | 8.2 |
| Density (g/cm$^3$) | 0.924 | 0.924 |
| Terminal vinyl group (number/1,000 carbon atoms) | 0.5 | 0.05 |
| Substrate | Paper | |
| Molding temperature (° C.) | 305 | |
| Molding speed (m/min.) | 200 | |
| Air gap (mm) | 120 | |
| Film thickness (μm) | 25 | |
| Ozone treatment | None | |
| (A) Adhesion strength | A | B |
| Odor | B | B |

TABLE 2

|  | Example 2 | Comparative Example 2 |
|---|---|---|
| LPDE TYPE | I | III |
| Amount (wt %) | 100 | 100 |
| MFR (g/10 min.) | 8.5 | 8.2 |
| Density (g/cm$^3$) | 0.924 | 0.924 |
| Terminal vinyl group (number/1,000 carbon atoms) | 0.5 | 0.05 |
| Substrate | Paper | |
| Molding temperature (° C.) | 320 | |
| Molding speed (m/min.) | 400 | |
| Air gap (mm) | 160 | |
| Film thickness (μm) | 15 | |
| Ozone treatment | None | |
| (A) Adhesion strength | A | C |
| Odor | C | C |

TABLE 3

|  | Example 3 | Comparative Example 3 |
|---|---|---|
| LPDE TYPE | I | III |
| Amount (wt %) | 100 | 100 |
| MFR (g/10 min.) | 8.5 | 8.2 |
| Density (g/cm$^3$) | 0.924 | 0.924 |
| Terminal vinyl group (number/1,000 carbon atoms) | 0.5 | 0.05 |
| Substrate | Paper | |
| Molding temperature (° C.) | 260 | |
| Molding speed (m/min.) | 250 | |
| Air gap (mm) | 160 | |
| Film thickness (μm) | 25 | |
| Ozone treatment | Treated | |
| (A) Adhesion strength | A | B |
| Odor | A | A |

TABLE 4

|  | Example 4 | Example 5 |
|---|---|---|
| LPDE TYPE | I | I |
| Amount (wt %) | 80 | 90 |
| MFR (g/10 min.) | 8.5 | 8.5 |
| Density (g/cm$^3$) | 0.924 | 0.924 |
| Terminal vinyl group (number/1,000 carbon atoms) | 0.5 | 0.5 |
| HDPE (wt %) | 20 | 0 |
| TiO$_2$ (part by weight) | 0 | 10 |
| Substrate | Paper | |
| Molding temperature (° C.) | 260 | |
| Molding speed (m/min.) | 250 | |
| Air gap (mm) | 160 | |
| Film thickness (μm) | 25 | |
| Ozone treatment | Treated | |
| (A) Adhesion strength | A | A |
| Odor | A | A |

TABLE 5

|  | Example 6 | Example 7 |
|---|---|---|
| LPDE TYPE | I | II |
| Amount (wt %) | 100 | 100 |
| MFR (g/10 min.) | 8.5 | 8.4 |
| Density (g/cm$^3$) | 0.924 | 0.924 |
| Terminal vinyl group (number/1,000 carbon atoms) | 0.5 | 0.43 |
| Substrate | Aluminum foil | |
| Molding temperature (° C.) | 305 | |
| Molding speed (m/min.) | 200 | |
| Air gap (mm) | 120 | |
| Film thickness (μm) | 25 | |
| Ozone treatment | None | |
| (B) Adhesion strength (g/15 mm wide) | 330 | 200 |
| Odor | B | B |

TABLE 6

|  | Comparative Example 4 | Comparative Example 5 |
|---|---|---|
| LPDE TYPE | III | III |
| Amount (wt %) | 100 | 100 |
| MFR (g/10 min.) | 8.2 | 8.2 |
| Density (g/cm$^3$) | 0.924 | 0.924 |
| Terminal vinyl group (number/1,000 carbon atoms) | 0.05 | 0.05 |
| Substrate | Aluminum foil | |
| Molding temperature (° C.) | 305 | 320 |
| Molding speed (m/min.) | 200 | 200 |
| Air gap (mm) | 120 | 120 |
| Film thickness (μm) | 25 | 25 |
| Ozone treatment | None | None |
| (B) Adhesion strength (g/15 mm wide) | 50 | 300 |
| Odor | B | C |

TABLE 7

|  | Example 8 | Comparative Example 6 |
|---|---|---|
| LPDE TYPE | I | III |
| Amount (wt %) | 100 | 100 |
| MFR (g/10 min.) | 8.5 | 8.2 |
| Density (g/cm$^3$) | 0.924 | 0.924 |
| Terminal vinyl group (number/1,000 carbon atoms) | 0.5 | 0.05 |
| Substrate | Aluminum foil | |
| Molding temperature (° C.) | 305 | |
| Molding speed (m/min.) | 250 | |
| Air gap (mm) | 160 | |
| Film thickness (μm) | 25 | |
| Ozone treatment | Treated | |
| (A) Adhesion strength (g/15 mm wide) | 350 | 150 |
| Odor | A | A |

TABLE 8

|  | Example 9 | Comparative Example 7 |
|---|---|---|
| LPDE TYPE | IV | V |
| Amount (wt %) | 100 | 100 |
| MFR (g/10 min.) | 30 | 30 |
| Density (g/cm$^3$) | 0.924 | 0.924 |
| Terminal vinyl group (number/1,000 carbon atoms) | 0.57 | 0.05 |
| Substrate | Paper | |
| Molding temperature (° C.) | 250 | |
| Molding speed (m/min.) | 250 | |
| Air gap (mm) | 160 | |
| Film thickness (μm) | 25 | |
| Ozone treatment | Treated | |
| (A) Adhesion strength | A | B |
| Odor | A | A |

TABLE 9

|  | Example 10 | Comparative Example 8 |
|---|---|---|
| LPDE TYPE | VI | VII |
| Amount (wt %) | 100 | 100 |
| MFR (g/10 min.) | 50 | 50 |
| Density (g/cm$^3$) | 0.924 | 0.924 |
| Terminal vinyl group (number/1,000 carbon atoms) | 0.6 | 0.05 |
| Substrate | Paper | |
| Molding temperature (° C.) | 250 | |
| Molding speed (m/min.) | 250 | |
| Air gap (mm) | 160 | |
| Film thickness (μm) | 25 | |
| Ozone treatment | Treated | |
| (B) Adhesion strength | A | B |
| Odor | A | A |

TABLE 10

|  | Example 11 | Comparative Example 9 |
|---|---|---|
| LPDE TYPE | IV | V |
| Amount (wt %) | 100 | 100 |
| MFR (g/10 min.) | 30 | 30 |
| Density (g/cm$^3$) | 0.924 | 0.924 |
| Terminal vinyl group (number/1,000 carbon atoms) | 0.57 | 0.05 |
| Substrate | Aluminum foil | |
| Molding temperature (° C.) | 250 | |
| Molding speed (m/min.) | 200 | |
| Air gap (mm) | 120 | |
| Film thickness (μm) | 25 | |
| Ozone treatment | Treated | |
| (B) Adhesion strength (g/15 mm wide) | 350 | 70 |
| Odor | A | A |

TABLE 11

|  | Example 12 |
|---|---|
| LPDE TYPE | IV |
| Amount (wt %) | 100 |
| MFR (g/10 min.) | 50 |
| Density (g/cm$^3$) | 0.924 |
| Terminal vinyl group (number/1,000 carbon atoms) | 0.6 |
| Substrate | Aluminum foil |
| Molding temperature (° C.) | 250 |
| Molding speed (m/min.) | 250 |
| Air gap (mm) | 120 |
| Film thickness (μm) | 25 |
| Ozone treatment | Treated |
| (B) Adhesion strength (g/15 mm wide) | 360 |
| Odor | A |

As will be apparent from a comparison between Example 1 and Comparative Example 1, and a comparison between Example 6 and Comparative Example 4, Examples 1 and 6 exhibited high adhesion strength during low-temperature, high-speed molding. As will be apparent from a comparison between Example 2 and Comparative Example 2, Example 2 can exhibit high adhesion strength upon laminate molding at a conventional high molding temperature of 320° C. even in high speed molding. Further, as will be apparent from Examples 3 and 8, the practice of surface treatment can provide high strength while preventing odors upon more severe low-temperature, high-speed molding conditions. Furthermore, in all of the Examples, the film thickness could be made thinner.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

Industrial Applicability

According to the low-density polyethylene resin or the composition thereof of the present invention, a laminate having high interlayer adhesion strength can be obtained also by low-temperature molding, high-speed molding or low-temperature and high-speed molding. So that a laminate which has no odor can be obtained high productivity. The laminate is suitable for application to, for example, food wrapping materials, containers, etc.

What is claimed is:

1. A low-density polyethylene resin for laminates, wherein the resin is a high-pressure polyethylene having a density of 0.910 to 0.935 g/cm$^3$, a melt flow rate of 8.4 to 300 g/10 min., and a terminal vinyl group number of 0.4 or more per 1,000 carbon atoms.

2. The low-density polyethylene resin for laminates as claimed in claim 1, wherein the resin is polymerized at a pressure in the range of 500 to 3,500 Kg/cm$^2$G, at a polymerization temperature in the range of 100 to 400° C., with continuous feeding of ethylene and propylene in the presence of a radical polymerization initiator.

3. A low-density polyethylene resin composition for laminates, wherein the resin composition comprises a low-density polyethylene resin as claimed in claim 1, to which less than 50 wt % of another polyethylene-based resin is blended.

4. The low-density polyethylene resin composition for laminates as claimed in claim 3, wherein the other polyethylene-based resin is at least one selected from the group consisting of super low-density polyethylene having a density of 0.86 to less than 0.91 g/cm$^3$, linear low-density polyethylene having a density of 0.91 to 0.94 g/cm$^3$, high-density polyethylene having a density of 0.94 to 0.97 g/cm$^3$, ethylene/vinyl ester copolymer, a copolymer of ethylene/α, β-unsaturated carboxylic acid, a copolymer of ethylene/α, β-unsaturated carboxylate and a metal salt of ethylene/α,β-unsaturated carboxylic acid.

5. A laminate, wherein a layer of low-density polyethylene resin as claimed in claim 1 is provided on at least one surface of a substrate.

6. A laminate, wherein a layer of low-density polyethylene resin composition as claimed in claim 3 is provided on at least one surface of a substrate.

7. A production method for a laminate by an extrusion lamination method, comprising:

a substrate supplying step for supplying a substrate, a resin surface treating step for practicing ozone treatment on a molten film consisting of a low-density polyethylene resin as claimed in claim 1, a laminating step for pressing a surface of the molten film on which ozone treatment has been practiced onto at least one surface of the supplied substrate, and a winding step for winding the resultant laminate.

8. A production method for a laminate by extrusion lamination method, comprising:

a substrate supplying step for supplying a substrate, a resin surface treating step for practicing ozone treatment on a molten film consisting of a low-density polyethylene resin composition as claimed in claim 3, a laminating step for pressing a surface of the molten film on which ozone treatment has been practiced onto at least one surface of the supplied substrate, and a winding step for winding the resultant laminate.

9. The production method for a laminate as claimed in claim 7, carrying out corona treatment on the substrate in the substrate supplying step.

10. The production method for a laminate as claimed in claim 8, carrying out corona treatment on the substrate in the substrate supplying step.

11. The production method for a laminate as claimed in claim 7, setting the resin temperature to 200 to 310° C. in the laminating step.

12. The production method for a laminate as claimed in claim 8, setting the resin temperature to 200 to 310° C. in the laminating step.

13. The production method for a laminate as claimed in claim 7, setting the molding speed to 200 to 400 m/min in the laminating step.

14. The production method for a laminate as claimed in claim 8, setting the molding speed to 200 to 400 m/min in the laminating step.

15. The production method for a laminate as claimed in claim 7, setting the ozone blowing concentration to 1 to 300 g/m$^3$, and the ozone blowing amount to 0.1 to 30 m$^3$/hr in the resin surface treating step.

16. The production method for a laminate as claimed in claim 8, setting the ozone blowing concentration to 1 to 300 g/m$^3$, and the ozone blowing amount to 0.1 to 30 m$^3$/hr in the resin surface treating step.

17. The production method for a laminate as claimed in claim 9, carrying out the corona treatment setting the discharge amount to 1 to 300 W·min./m$^2$.

18. The production method for a laminate as claimed in claim 10, carrying out the corona treatment setting the discharge amount to 1 to 300 W·min./m$^2$.

19. The low-density polyethylene resin for laminates as claimed in claim 1, wherein the resin has a melt flow rate of 10 to 300 g/10 min.

20. The low-density polyethylene resin for laminates as claimed in claim 1, wherein the resin has a melt flow rate of 10 to 80 g/10 min.

21. A laminate as claimed in claim 5, wherein the substrate is sheet-like.

* * * * *